E. V. MYERS.
TIRE VALVE.
APPLICATION FILED MAR. 21, 1916.
1,231,548.
Patented June 26, 1917.
2 SHEETS—SHEET 1.
Fig. 1.    Fig. 2.    Fig. 3.    Fig. 4.
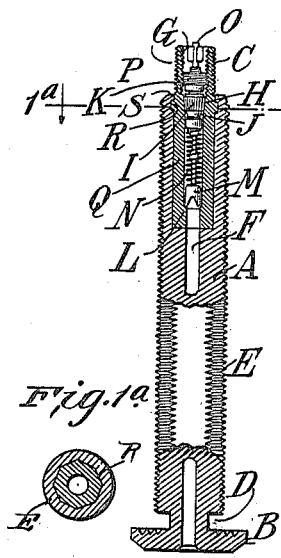
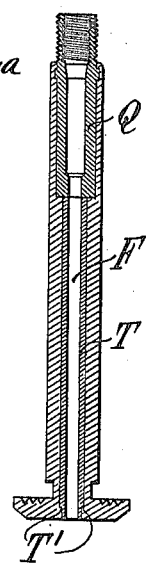
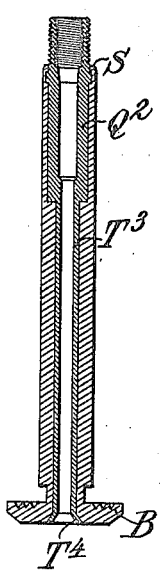
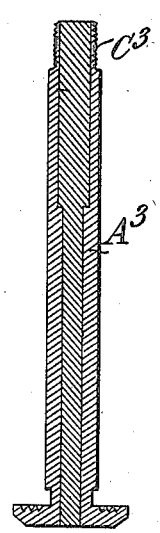
Fig. 5.    Fig. 10.    Fig. 11.
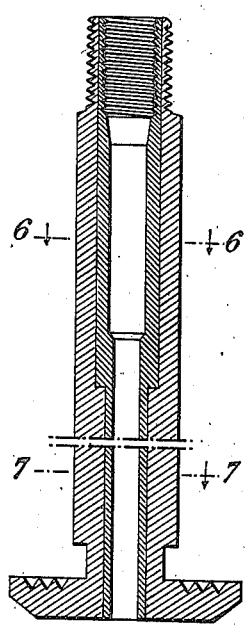
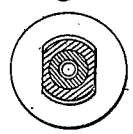
Fig. 6.
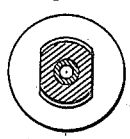
Fig. 7.
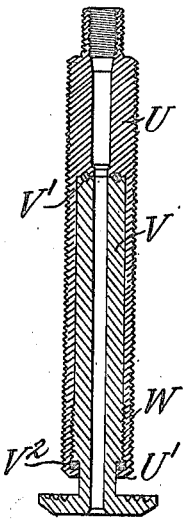
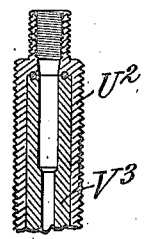
Fig. 9.
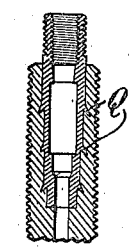
Fig. 8.
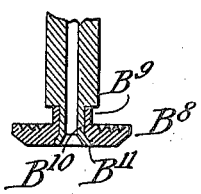
WITNESSES:
Renè Spuine
J. J. Wallac
INVENTOR:
Eugene V. Myers
By Attorneys,
Fraser, Turk & Myers

E. V. MYERS.
TIRE VALVE.
APPLICATION FILED MAR. 21, 1916.

1,231,548.

Patented June 26, 1917.
2 SHEETS—SHEET 2.

WITNESSES:
René Spuine
T. J. Wallace

INVENTOR:
Eugene V. Myers
By Attorneys,
Fraser

UNITED STATES PATENT OFFICE.

EUGENE V. MYERS, OF EAST ORANGE, NEW JERSEY, ASSIGNOR TO A. SCHRADER'S SON, INC., OF BROOKLYN, NEW YORK, A CORPORATION OF NEW YORK.

TIRE-VALVE.

1,231,548.        Specification of Letters Patent.      Patented June 26, 1917.

Application filed March 21, 1916. Serial No. 85,633.

*To all whom it may concern:*

Be it known that I, EUGENE V. MYERS, a citizen of the United States of America, residing in East Orange, in the county of Essex and State of New Jersey, have invented certain new and useful Improvements in Tire-Valves, of which the following is a specification.

This invention relates to tire valves or similar devices and aims to provide certain improvements therein.

Valves for pneumatic tires usually comprise a long casing member commonly called a valve stem which is provided with a bore from end to end. The maximum diameter of such casings is limited due to the condition that the valve must pass through a hole in the vehicle rim, and such hole is limited in size. Hence the internal bore must necessarily be of small dimensions. In those constructions wherein the valve casing is provided with a reduced nipple at its inner end the diameter of this bore is still further limited.

Within the bore is usually located a valve seat and a valve plunger, together with a spring for operating the plunger, and these parts are customarily made separately and inserted within the bore by screwing them in.

The valve casings as thus described have almost invariably been made of brass owing to the fact that the valves in use are subjected to wet and moisture and would speedily rust if not formed of a non-rusting metal. It is particularly desirable that the inner parts of the valve casing and particularly the portions near the inner end shall be rust-proof, since it is at these portions that the actual working parts of the valve are located. It has also been customary to nickel-plate the casings but it is found in practice that the nickel-plating does not extend to any material extent into the bore of the valve casing.

The most expensive part of the valve is the casing and it materially increases the cost thereof to construct it of brass or other expensive non-corroding metal. The object of the present invention is to reduce the cost of the casing by forming it at least in part of steel or other cheap metal in such manner as to avoid the deleterious effects of rust, particularly on the inner part of the casing.

In the drawings I have shown a number of methods of accomplishing this result.

Referring to the drawings,—

Figure 1 is a view partly in diametrical section of one construction.

Fig. 1ª is a cross section of a detail.

Fig. 2 is a sectional view of another construction.

Fig. 3 is a similar view of still another construction.

Fig. 4 is a similar view of a blank, partly made.

Fig. 5 is a similar section of the valve of Fig. 4 completed.

Fig. 6 is a section on the line 6—6 in Fig. 5.

Fig. 7 is a section on the line 7—7.

Fig. 8 is a detailed view of the lower part of the casing, showing another feature of construction.

Figs. 9 to 18 show other forms of the invention.

Figure 13:
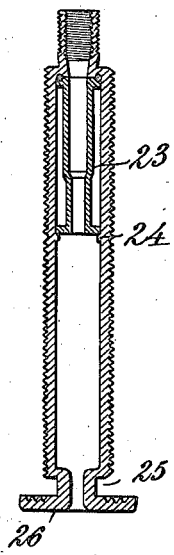

Referring first to Fig. 1, let A indicate the body of the casing, B its flanged foot, and C its nipple. This construction is that of the standard Schrader valve. The casing A is provided above the flanged foot B with a recess D designed to receive the edges of the tire tube. It is screw-threaded on its exterior at E to receive a rim nut, dust cap, etc. Extending through the casing A is a bore F which in the construction shown is enlarged at its upper end to receive the working parts of the valve. In the usual construction the upper end of the bore is interiorly screw-threaded at G, and immediately below the screw-threaded part is a tapered shoulder H which is adapted to engage the packing I of a valve seat member J. A plug K is provided which engages the screw-thread G and forces the packing I against the shoulder H. A lower shoulder L is usually provided to engage a spring holder M which forms a stop for the lower part of the spring N. The plug K, seat J, spring N, and spring holder M are linked together by a pin O, so that the valve parts are removable as a whole.

According to the present invention as shown in this figure, the body A of the casing and the foot B are constructed of steel, iron, or some other cheap metal. This will preferably be nickel or copper-plated on its exterior so as to resist rusting action. This is the least important part of the valve casing, so far as rust is concerned, and a proper coating can be made since it is on the exterior of the casing.

With regard to the interior of the casing, however, it is impossible by ordinary methods to protect the metal from rusting, since the metal will not electrolytically deposit into the bore of the valve. The parts which must be particularly protected are the shoulder J, the thread G and that part of the bore which mainly receives the valve insides are working parts. The valve cap and pump coupling (which are not shown) which are habitually and frequently used with pneumatic tires also render it difficult to protect the exterior thread P of the nipple sufficiently by plating methods to avoid wearing off and rusting.

In the construction shown in Fig. 1 I hence construct the valve casing in two parts, one the body A of the casing, which as before stated is preferably of some cheap metal, and the other an insert Q which is of brass, copper, or other non-rusting metal. The insert Q preferably contains all of the working parts, and is formed with a nipple C, so that no rusting is possible on the interior of the insert and the exterior and interior of the nipple.

The insert Q according to the present invention is permanently attached to the body of the casing in such manner that the two parts constitute a single casing. It is to be clearly distinguished from those constructions in which a plug is provided for the valve casing and which carries the working parts of the valve. Such constructions are invariably used for the purpose of providing larger working parts of the valve, the valve parts being introduced through the bottom of the plug. In order to gain access to the working parts in such constructions it is essential that the plug be removable, and this has introduced an element of weakness into such constructions which has never been overcome. A removable joint is constantly open to leakage, particularly on account of the torsional strain which is put upon the plug in screwing and unscrewing couplings, caps, etc. The invention shown in Fig. 1 is directed to that type of valve in which the valve insides are removable through the top, and the insert is a permanent and fixed part of the valve shell and connected to it with a leak-tight joint.

The union between the insert and the body of the casing must be such as to prevent displacement by pressure and leakage around the joint.

The insert may be, for instance, soldered to the valve body, or it may be screwed in with such force as to bring contacting shoulders into contact so intimately as to prevent leakage. In such cases the contacting parts may be tapered or tapered shoulders may be formed thereon.

I have found in practice that the parts can be united by making the insert of slightly larger diameter than the bore in which it fits, and forcing the insert by pressure into the bore. This produces a leak-tight joint, the slight unevenness of the two parts being compensated by the flowing or smoothing down of the walls of the insert. Such a construction is found to prevent leakage under high pressure. It is preferable, however, to form a small shoulder such as R on the insert and turn a flange, such as S, over the top of it, in order to avoid any possibility of dislodgment. Such a construction will also resist the ordinary torsional strains of screwing and unscrewing the cap and pump coupling, but if desired non-circular surfaces may be formed on the insert and valve body as shown in Fig. 1$^a$ where the shoulder R is polygonal and the top of the bore of the body is similarly formed to provide an additional safeguard against turning, or any other suitable mode may be employed for this purpose. If desired also the insert may be slightly tapered and the bore correspondingly tapered.

By this construction I secure in effect a valve having the same rust-resisting properties as a brass valve at those points where it is essential that these properties shall be present. At the same time the cost of construction is greatly reduced, since the weight of metal used in the brass insert is comparatively small in proportion to the total weight of the valve body. As thus constructed the valve in appearance is similar to an ordinary brass valve. It may be nickeled when completed or coated on its exterior, as may be desired.

Fig. 2 shows a similar construction except that the bore F' is protected by a sleeve T of some rust-resisting material, such as brass, lead, or the like. The sleeve may have a shoulder T' at its bottom designed to rest against a similar shoulder T$^2$ formed on the interior of the shell. As the function of this sleeve is only to prevent rusting of the bore, no special pains need be taken to provide a leak-tight joint between the sleeve and the casing.

In Fig. 3 the construction is similar except that the insert Q$^2$ is provided with an integral sleeve T$^3$. In this construction a flange T$^4$ may be formed at the lower end of the casing. In this construction if a line of solder is made between the end of the sleeve and the foot B, or other means be adopted at the foot to secure a leak-tight joint, the fit of the insert and sleeve need not be precise. In such construction, particularly if the flange S at the top of the casing is of sufficient strength to mechanically hold the insert, the line of solder need only be such as to prevent the leakage of air between the insert and the casing.

In Figs. 4 and 5 I have shown a valve body $A^3$ formed of steel, iron or the like, which valve body has a nipple $C^3$ at its top formed integrally of the same metal. The bore in this case may be filled with a rust-proof material such as solder, zinc, or the like, suitable fluxes being used if necessary to secure an adherence of the zinc plug to the steel. The valve is then bored out to make its various internal threads, seats, etc., as shown in Fig. 5. Such construction provides a valve casing which is lined throughout with a rust-proof material.

In Fig. 8 is shown a construction in which a brass or other rust-resisting foot $B^8$ is employed. In this case the brass foot is preferably provided with a collar $B^9$ and the casing is provided with an integral sleeve $B^{10}$ passing through the collar and upset on the under side of the foot. The line of solder may be employed at $B^{11}$ and the parts may be forced together with a leak-tight joint.

In the constructions of Figs. 1, 2 and 3 the insert may be united to the body of the shell before the drilling, seat-forming operations and screw-threading operations are performed on the insert, or these may be done prior to the insertion.

Another method of constructing the insert is to provide a series of molds or formers of the correct interior shape of the valve casing and electrically deposit copper or other metal on the outside of such formers, thereby obtaining an insert or sleeve of proper internal contour, the valve body being formed with an internal contour similar to the external contour of the insert or sleeve. The formers or cores may be then removed (or if made of paraffin or the like may be melted out), and the insert or sleeve placed within the valve body and secured by upsetting one or more parts, or by soldering, or by other suitable methods.

In Fig. 9 I have illustrated another construction of insert having a flange $Q'$ (preferably a plurality of them) which are designed to contact with similar internal flanges on the steel valve body. As the plug is forced in under pressure, these flanges are bent back and not only secure a mechanical joint but an air-tight joint between the parts.

Another method of securing the insert in place is to provide a screw-thread on the interior of the valve body and a corresponding thread on the plug and screw the parts so tightly together as to cause the body to wear a seat on the plug. When the parts are in this condition a flange similar to S may be turned over the insert so that it cannot unscrew. In performing such an operation it is desirable to construct the machine which screws the plug in so that it feeds forward at substantially the same rate as the insert advances, this taking up some of the strain on the threads. Before the parts are released from the machine the flange is turned over to hold the parts in place. In either of these operations a tapered seat may be formed in the valve body and a similar face on the insert.

In Fig. 10 I have shown a form of valve in which the part U is constructed of brass, for instance, and the part V of iron or steel. In this construction the part U may be formed of a piece of rod and bored for a certain portion of its length, and the part V formed of a headed plug of steel. The parts may be screwed together as shown at W and preferably the part U is turned over the part V at the bottom, as shown at $U'$. Along the flats of the valve the part U may be indented to assist against relative rotative movement. It is preferred to use a packing ring $V'$ at the upper portion of the part V and also a second packing ring $V^2$ at the lower portion. Both of these packings may be made of lead or other soft metal, and thereby prevent any leakage between the parts.

In Fig. 11 the construction is similar except that the part $V^3$ extends farther up into the part $U^2$; as shown it extends just below the seat. Packings are used which are similar to those shown in Fig. 10.

In the construction of Fig. 10 the valve chamber, seat and nipple are formed of brass, and in Fig. 11 the seat and nipple are formed of brass; hence rusting is prevented.

Figure 12:
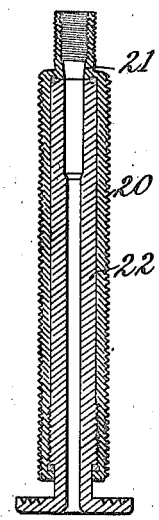

In Fig. 12 I have shown a construction which is similar to the construction of Fig. 11 except that the outer part 20 is formed as a drawn shell or tubing of brass. This shell includes the nipple and preferably also the seat 21. Within the shell is located a plug 22 of steel which has a screw-threaded connection with the shell as shown, the parts being preferably packed as in Fig. 10. In the constructions of Figs. 10 and 11 the saving in metal is partly due to the recovery of the turnings. In Fig. 12 the saving is due to the use of a less weight of brass.

In this figure if a valve with flattened sides is desired and the parts are united by a screw-thread, the shell 20 is drawn around and the part 22 is formed with flattened sides, the screw-threaded portion of the part 22 being thereby mutilated. After the parts are united, the shell 20 is compressed onto the flats of the part 22. Or if a screw-threaded joint is not desired, both parts may be formed with flattened sides. Or if a thick drawn shell is used, the flats may be cut from the shell as is now customary with solid brass valves.

In Fig. 13 I have shown a similar construction of drawn shell except that in this case the entire valve is drawn. It is advisable in this construction to use an internal guide member 23 which is held in place either frictionally or by indentations 24 or by some other means. This guide member receives the insides. In constructing the valve of Fig. 13 it is preferable to compress the neck 25 by a suitable rolling or swaging operation whereby to form a groove for receiving the tire tube. The foot 26 may either be formed separately and united, as in Fig. 8, or in any other suitable manner, or it may be formed integrally by a series of drawing or pressing operations.

Figure 14:
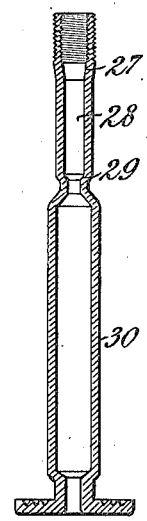

In Fig. 14 I have illustrated a construction in which the seat 27, valve chamber 28 and spring holder seat 29 are formed directly from the metal of the shell 30, the whole construction being preferably drawn from brass. The various constricted diameters and seats may be formed by pressing or rolling operations on the exterior of the shell.

Figure 15:
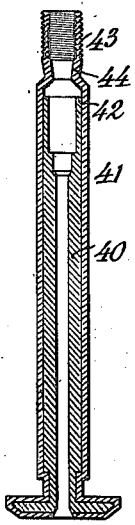
Figure 16:
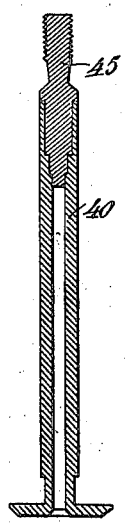

In Fig. 15 I have illustrated a valve shell having a steel or other metal core 40 and a surrounding shell 41 of brass or other rust-proof material. In this figure the metal core 40 extends to a point indicated at 42, and the shell 41 extends upwardly therefrom to include the nipple 43 and seat 44. In this construction, therefore, the body of the nipple and its threads and seat are of non-rusting metal. This construction is best formed by electro-plating the core with a non-rusting metal. In practising this process the core 40 is first provided with a plug 45 of the appropriate internal shape of the nipple and upper part of the valve casing. The core is formed of a material, such as paraffin, or lead, which can be removed after the plating process. The combined structure is then put into an electro-plating bath, and a coating which is sufficiently thick to give the necessary strength of metal for the nipple is then deposited on the core and plug. The plug is then melted or dissolved, and on its interior will have the appropriate nipple, thread and seat. The exterior can then be finished and threaded.

Figure 17:
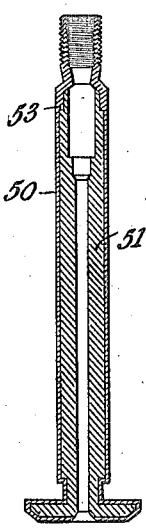
Figure 18:
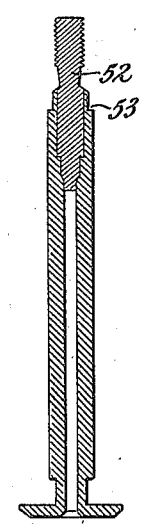

In Figs. 17 and 18 a similar construction is shown except that the plating 50 on the core 51 is thinner. This construction is best made by the use of a plug 52. The plug and core may be first plated to obtain the necessary thickness for the coating 50, whereupon the coated structure may be then immersed, to, let us say, the point 53 in a nonplating liquid which hardens, such as paraffin or the like, and a second plating operation then performed to build up the thickness of metal from the point 53 to the top of the nipple. If a plug in either of these cases is used which will not take an electro-deposited coating, it may be treated with a metallic powder, or in some other suitable way, to render it possible to coat it.

The coating processes require very little labor and the amount of expensive metal used is small as compared with the weight of the casing.

If it is desired to provide a steel valve body with a copper or nickel coating, the following methods may be adopted according to my invention:

A steel valve body is constructed with proper passages, screw-threads, etc., and it is mounted in an electrolytic bath over but separated from a pin which constitutes the anode. This pin penetrating within the bore, will electroplate the same. If it is desired to electroplate the bore with nickel, a nickel anode pin will naturally be chosen. If it is to be electroplated with another metal, the appropriate metal will be chosen.

Another method of electroplating the internal bores of the valve is to produce a very rapid circulation of the electrolytic fluid through the bores. It is preferable that the electrolyte during this operation pass only through the bores rather than through the bores and around the exteriors of the casings. For this purpose the valves may be mounted in a partition, and the electrolyte being set in motion can only pass through the partition by passing through the valve bores. A second partition may be arranged at the opposite ends of the valves so that the electrolyte does not come in contact with the exteriors of the shells either before or after passing through the bores. This partition or partitions may be arranged in the electrolytic vat and the circulation may be produced by a pump, or by other suitable means.

A further method of constructing the valve casing is by a casting preferably of the pressure type. Thus the constructions of Figs. 3, 9 and 10 to 18 may be cast in a suitable mold which preferably has a pin of proper form to mold the internal chambers. In Fig. 3, for instance, the steel shell may be inserted in the mold and the brass or other rust-proof metal cast within it. In Figs. 10 and 11 the rust-proof metal may be cast upon the shell, as also in the case of Fig. 12. In Fig. 13 the shell may be cast either with or without the guide, and the neck 25 afterward rolled or swaged in. In Fig. 14 a similar operation may be performed. In Figs. 15 to 18 a steel casting is made around the steel member. In these figures the plugs corresponding to 45, 52 should be so formed that they can be removed bodily after the casting operation.

While I have shown and described a number of forms of the invention, it will be understood that I do not wish to be limited thereto since various changes may be made therein without departing from the invention. Furthermore, the steps herein set forth may be combined in any desired manner to produce the result required.

I do not herein specifically claim the method involved in the construction of Figs. 1 to 3, 8 and 9 as this forms the subject-matter of a divisional application filed May 22, 1917, Serial No. 170,179; nor do I claim the specific constructions of Figs. 4 to 8 and 10 to 18, nor the methods therein involved, since these form the subject-matter of a divisional application filed May 21, 1917, Serial No. 169,846.

What I claim is:—

1. A composite valve shell for motor vehicle tires formed to permit the introduction of a check mechanism into its outer end, and its removal therefrom, and said shell formed with a body portion of strong, rigid and cheap metal, such as iron or steel, and an end part of rust-resisting metal, such as brass, said two parts being united with a permanent joint to provide a unitary structure which is substantially integral, said joint being leak-tight and non-rotative under all conditions of use.

2. A composite valve shell for motor vehicle tires formed to permit the introduction of a check mechanism into its outer end, and its removal therefrom, and said shell formed with a body portion of strong, rigid and cheap metal, such as iron or steel, and a plug of rust-resisting material, such as brass, entering the outer end of the shell, and said two parts being united with a permanent joint to provide a unitary structure which is substantially integral, said joint being leak-tight and non-rotative under all conditions of use.

3. A composite valve shell for motor vehicle tires formed to permit the introduction of a check mechanism into its outer end, and its removal therefrom, and said shell formed with a body portion of strong, rigid and cheap metal, such as iron or steel, and a plug of rust-resisting material, such as brass, entering the outer end of the shell, and said plug being formed with a passage having an internal screw thread and a shoulder below said thread, and said two parts being united with a permanent joint to provide a unitary structure which is substantially integral, said joint being leak-tight and non-rotative under all conditions of use.

4. A composite valve shell for motor vehicle tires formed to permit the introduction of a check mechanism into its outer end, and its removal therefrom, and said shell formed with a body portion of strong, rigid and cheap metal, such as iron or steel, and a plug of rust-resisting material, such as brass, entering the outer end of the shell, and said plug being formed with a passage having an internal screw-thread and a shoulder below said thread, and a valve chamber below said shoulder, said two parts being united with a permanent joint to provide a unitary structure which is substantially integral, said joint being leak-tight and non-rotative under all conditions of use.

5. A composite valve shell for motor vehicle tires formed to permit the introduction of a check mechanism into its outer end, and its removal therefrom, and said shell formed with an externally threaded body portion of strong, rigid and cheap metal, such as iron or steel, and a plug of rust-resisting metal, such as brass, said two parts being united with a permanent metallic joint to provide a unitary structure which is substantially integral, said joint being leak-tight and non-rotative under all conditions of use.

6. A composite valve shell for motor vehicle tires formed to permit the introduction of a check mechanism into its outer end, and its removal therefrom, and said shell formed with an externally threaded body portion of strong, rigid and cheap metal, such as iron or steel, and a plug of rust-resisting metal, such as brass, said two parts being in permanent leak-tight surface contact to provide a unitary structure which is substantially integral, said joint being leak-tight and non-rotative under all conditions of use.

7. A composite valve shell comprising an iron or steel body member having a foot or shoe at its inner end, a threaded exterior, and a bore in its outer end, and a plug of rust-resisting metal in said bore and extending beyond the body to form a nipple of reduced diameter, said plug being formed with a bore having an internal screw-thread and having a permanent metal to metal leak-tight joint with the body to provide a unitary structure which is substantially integral, the valve having a check mechanism which is removable without disturbing the joint.

8. A composite valve shell comprising an iron or steel body member having a foot or shoe at its inner end, a threaded exterior, and a bore in its outer end, and a plug of rust-resisting metal in said bore and extending beyond the body to form a nipple of reduced diameter, said plug being formed with a bore having an internal screw-thread and having a metal to metal leak-tight joint with the body to provide a unitary structure which is substantially integral, and means for positively preventing relative rotation of said parts.

9. A composite valve shell for motor vehicle tires formed with a body portion of strong and rigid oxidizing material, such as iron or steel, and an end part of rust-resisting material, such as brass, one of said parts being provided with a bore, and the other being adapted to enter said bore, the metals themselves forming a permanent, non-rotative leak-tight joint between said parts to provide a unitary structure.

10. A composite valve shell for motor vehicle tires formed with a body portion of strong and rigid oxidizing material, such as iron or steel, and an end part of rust-resisting material, such as brass, one of said parts being provided with a bore and the other being adapted to enter said bore, said parts being unthreaded and being forced one into the other to provide a permanent, leak-tight joint whereby to produce a unitary structure.

11. A composite valve shell for motor vehicle tires having a clamping foot or shoe at its inner end and being constructed of rigid metal, said shell being formed to permit the introduction of a check mechanism into its outer end and its removal therefrom, and said shell formed with an externally threaded body portion of strong and rigid material, such as iron or steel, and a plug of rust-resisting material, such as brass, inserted within the outer end of said body portion and forming a nipple extending beyond the outer end of said body portion, said plug having an internal thread, a shoulder below said thread, and a valve chamber below said shoulder, and being forced within said body portion, the metals of the two parts forming a permanent, leak-tight joint whereby to provide a substantially integral and unitary structure.

12. A composite valve shell for motor vehicle tires having a clamping foot or shoe at its inner end and being constructed of rigid metal, said shell being formed to permit the introduction of a check mechanism into its outer end and its removal therefrom, and said shell formed with an externally threaded body portion of strong and rigid material, such as iron or steel, and a plug of rust-resisting material, such as brass, inserted within the outer end of said body portion and forming a nipple extending beyond the outer end of said body portion, said plug having an internal thread, a shoulder below said thread, and a valve chamber below said shoulder, and being forced within said body portion, the metals of the two parts forming a permanent, leak-tight joint whereby to provide a substantially integral and unitary structure, and independent means for positively preventing relative rotation of said parts.

13. A composite valve shell comprising an iron or steel member having a bore at its outer ends having an insert of rust-resisting metal in said bore, said insert being formed with a bore having an internal screw-thread and a shoulder below said screw-thread, and one of said parts having a series of ridges, and said insert being forced into said bore to form a metal to metal leak-tight joint with the body to provide a unitary structure which is substantially integral.

14. A composite valve shell comprising an iron or steel member having a bore at its outer end having an insert of rust-resisting metal in said bore, said insert being formed with a bore having an internal screw-thread and a shoulder below said screw-thread, and said body having a series of ridges in said bore, and said insert being forced into said bore to form a metal to metal leak-tight joint with the body to provide a unitary structure which is substantially integral.

15. A composite valve shell for motor vehicle tires formed to permit the introduction of a check mechanism into its outer end, and its removal therefrom, and said shell formed with a body portion of strong, rigid and cheap metal, such as iron or steel, and a plug of rust-resisting material, such as brass, entering the outer end of the shell, and said two parts being united with a permanent joint to provide a unitary structure which is substantially integral, said joint being leak-tight and non-rotative under all conditions of use, and a lining of rust-resisting material held between said plug and the bottom of said body portion.

In witness whereof, I have hereunto signed my name in the presence of two subscribing witnesses.

EUGENE V. MYERS.

Witnesses:
THOMAS F. WALLACE,
GRACE GUNDERMAN.